Aug. 9, 1960  J. M. LYNCH  2,948,411
BOOM PEDESTAL
Filed Sept. 22, 1958  2 Sheets-Sheet 1
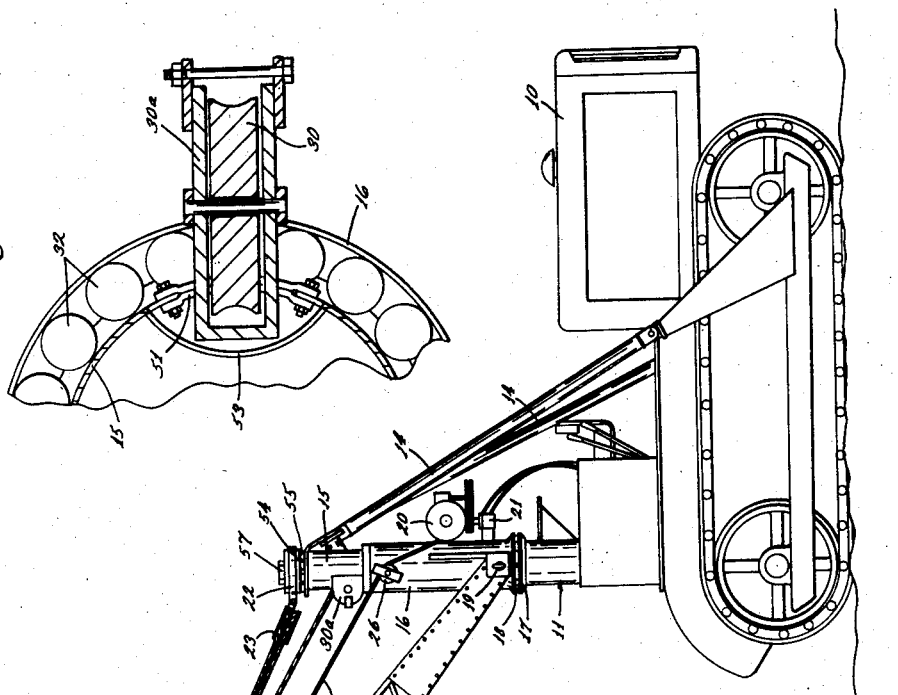
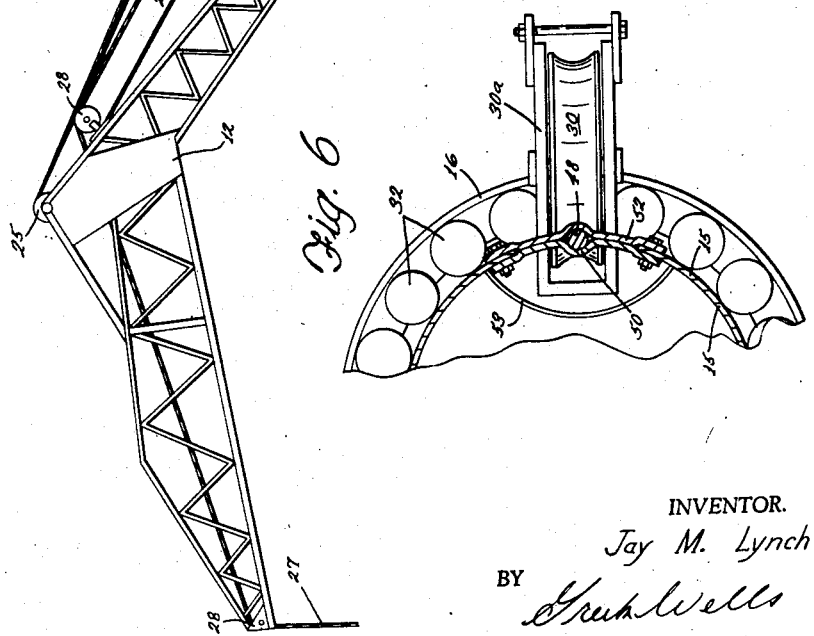
INVENTOR.
Jay M. Lynch
BY
Atty.

Aug. 9, 1960 J. M. LYNCH 2,948,411
BOOM PEDESTAL
Filed Sept. 22, 1958 2 Sheets-Sheet 2
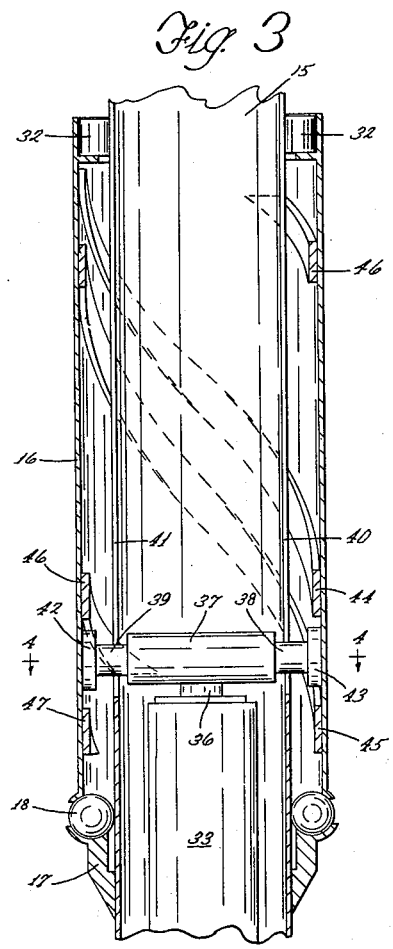
INVENTOR.
Jay M. Lynch
BY
Gruikwells
Atty.

United States Patent Office 2,948,411
Patented Aug. 9, 1960

2,948,411
BOOM PEDESTAL
Jay M. Lynch, Palouse, Wash.
Filed Sept. 22, 1958, Ser. No. 762,453
6 Claims. (Cl. 212—66)

My invention relates to a boom pedestal which is adapted for use in supporting a boom arm that is used for loading logs, etc. These booms are usually mounted on a powered vehicle such as a tractor or a logging truck. It is the principal purpose of my invention to provide an improved pedestal construction for mounting the boom arm, which pedestal construction includes means for swinging the boom arm about the pedestal by using a hydraulic jack within the pedestal.

Other and more detailed objects and advantages of the invention will appear more fully from the following description and the accompanying drawings wherein a preferred embodiment of the invention is shown. It should be understood, however, that minor changes may be made from the exact details shown and described without departing from the invention as defined in the claims.

In the drawings:

Figure 1 is a view in side elevation of a machine embodying a logging boom which is supported on a tractor by means of a pedestal which embodies my invention;

Figure 2 is an enlarged sectional view taken vertically through the boom pedestal;

Figure 3 is a further enlarged sectional view taken at right angles to Figure 2, illustrating the interior of the pedestal construction;

Figure 4 is an enlarged sectional view taken on the line 4—4 of Figure 3;

Figure 5 is an enlarged fragmentary sectional view taken on the line 5—5 of Figure 2; and Figure 6 is an enlarged fragmentary sectional view taken on the line 6—6 of Figure 2.

Referring now in detail to the drawings, my invention is shown as applied to a logging machine which utilizes as its motive power a crawler type tractor 10. The boom pedestal of the present invention is shown at 11 and supports a boom 12 for swinging movement about the pedestal as an axis. The pedestal is supported at its lower end by a hinged plate 13 that is hinged to the tractor base frame so that the pedestal and the boom may be laid down or raised. In the raised position shown in Figure 1, the boom pedestal is held upright by two braces 14 that extend rearwardly and downwardly and are attached at their lower ends to the tractor frame. The pedestal 11 comprises an inner stationary member 15 and a rotatable sleeve 16 around the member 15. The sleeve 16 is supported at its lower end on a ring 17 provided on the member 15 and ball bearings 18 that are mounted by the ring 17. The boom 12 is hinged on the sleeve 16 by hinge members 19, one of which is shown in Figure 1. The boom tip is raised and lowered by a winch 20 that is mounted on the sleeve 16 and powered by a hydraulic motor 21. At the top of the member 15 a ring 22 supports a block 23 for a lifting and lowering cable 24 that is trained around another block 25 at the top of the boom and then downwardly around a guide pulley 26 to the winch 20. The load lifting cable 27 extends from the tip of the boom over pulleys 28 and 29 to a pulley 30 that is pivoted in the upper portion of the member 15 to swing on a vertical axis and extends downwardly from the pulley through the member 15 to the pulley 31 and horizontally to a main winch (not shown) on the tractor 10.

My invention concerns the pedestal 11 and particularly the connection between the members 15 and 16 by which the member 16 is rotatably supported and turned on the member 15. The details of this construction are shown best by Figures 2 to 4 inclusive. As stated hereinbefore, the sleeve 16 is rotatably mounted at its lower end on the ring 17 by ball bearings 18. At the top of the sleeve 16 roller bearings 32 are interposed between the sleeve 16 and the member 15. Within the member 15 in the lower portion thereof, I provide an hydraulic jack 33 which is mounted on the plate 13. This is a double acting jack, having a lower fluid inlet 34 and an upper fluid inlet 35 so as to reciprocate the piston rod 36 of the jack up and down within the member 15. The piston rod 36 carries a cross head 37 at its upper end and this cross head has reduced portions 38 and 39 which extend outwardly through slots 40 and 41 in the member 15. The slots 40 and 41 are diametrically opposite each other and extend parallel to the axis of the member 15. Connection of the cross head 37 to the outer sleeve 16 so as to rotate the sleeve 16 when the cross head is moved up and down is accomplished by providing rollers 42 and 43 on the outer ends of the cross head 37 and providing helical guide strips 44, 45, 46 and 47. These helical guide strips are alike and the upper guide strips 44 and 46 engage the rollers 42 and 43 when the cross head 37 is being moved upward so as to cause the sleeve 16 to turn on its bearings as the cross head slides upwardly in the slots 40 and 41. On the downward movement of the cross head 37, the rollers 42 and 43 bear on the helical strips 45 and 47 so as to force the sleeve 16 to turn in the opposite direction. With this construction the operator of the machine can control the turning of the boom very accurately merely by controlling the operation of the hydraulic jack 33.

The cable 27 must follow the boom of course. In order to permit this the pulley 30 must be so mounted that it can turn on a vertical axis. The pulley frame 30a has upper and lower bearing pins 48 and 49 fixed thereto. These bearings are supported in bearing sleeves 50 and 51 which are formed by removable straps 52 that are bolted to the member 15 which is cut away to receive the pulley 30. The member 15 also carries an inner guide 53 that extends from the opening for the pulley 30 to the bottom opening of the sleeve 15 for the pulley 31. This keeps the cable 27 protected between the pulleys 30 and 31.

The ring 22 at the top of the member 15 is carried by a cap 54 which is mounted on roller bearings 55 that are carried by a ring 56 fixed to the member 15. A bolt 57 holds the cap 54 down in place on the bearing 55.

It is believed that the construction and operation of the pedestal will be clear from the foregoing description. The rotation of the boom is accomplished in a very simple and effective manner by virtue of the connections between the sleeves 16 and the stationary member 15 which makes it possible for the jack 33 to control the horizontal turning of the boom with respect to the vehicle. The boom raising and lowering parts are all rotatably mounted on the member 15 since they are carried entirely by the sleeve 16 and the cap 54.

Having thus described my invention, I claim:

1. A pedestal for mounting a boom arm on a powered vehicle comprising an inner tubular stationary member, a sleeve member surrounding a part of said inner member and spaced therefrom, bearings on the inner member supporting said sleeve member for rotation about the inner member, boom arm mounting means on the sleeve member, a jack within the inner member, a cross head movable vertically in said inner member by said jack, said inner member having longitudinal slots therein through which the cross head extends, said slots forming a set of guides for the cross head, the sleeve member having a set of longitudinal guides on the interior thereof engaging said cross head, one of said sets of guides being helical whereby to rotate the sleeve member about the inner member when the cross head is moved lengthwise of the inner member by said jack.

2. The invention defined in claim 1 wherein the inner member has a cable channel therein and a pulley pivoted in the wall thereof above the sleeve.

3. The invention defined in claim 1 wherein the helical guides comprise pairs of strips fixed on the surface of one of said members and the cross head has rollers positioned between the strips of each pair.

4. A pedestal for mounting a boom arm on a powered vehicle comprising an inner tubular stationary member, means pivotally mounting one end of the member on the vehicle for swinging movement of the member between an upright position and a reclining position, a sleeve member surrounding a part of said inner member and spaced therefrom, bearings on the inner member supporting said sleeve member for rotation about the inner member, boom arm mounting means on the sleeve member, a jack within the inner member, a cross head movable vertically in said inner member by said jack, said inner member having longitudinal slots therein through which the cross head extends, said slots forming a set of guides for the cross head, the sleeve member having a set of longitudinal guides on the interior thereof engaging said cross head, one of said sets of guides being helical whereby to rotate the sleeve member about the inner member when the cross head is moved lengthwise of the inner member by said jack.

5. The invention defined in claim 4 wherein the inner member has a cap journalled on the top thereof provided with means to attach boom arm raising tackle.

6. A pedestal for mounting a boom arm on a powered vehicle comprising an inner tubular stationary member, a sleeve member surrounding a part of said inner member and spaced therefrom, bearings on the inner member at the top and bottom of the sleeve member supporting said sleeve member for rotation about the inner member, boom arm mounting means on the sleeve member, a hydraulic jack in the inner member having a cross head thereon movable by said jack up and down in the inner member, the inner member having diametrically opposed slots in the walls thereof within said sleeve and the cross head extending through the slots, the sleeve having diametrically opposed pairs of helical guide strips on the interior surface thereof, each end of the cross head being positioned between a pair of said helical guide strips.

References Cited in the file of this patent

UNITED STATES PATENTS

| | | |
|---|---|---|
| 1,856,907 | Chapman | May 3, 1932 |
| 2,850,836 | Copeland | Sept. 9, 1958 |

FOREIGN PATENTS

| | | |
|---|---|---|
| 1,085,841 | France | Aug. 4, 1954 |